United States Patent [19]
Robb et al.

[11] Patent Number: 6,049,622
[45] Date of Patent: Apr. 11, 2000

[54] GRAPHIC NAVIGATIONAL GUIDES FOR ACCURATE IMAGE ORIENTATION AND NAVIGATION

[75] Inventors: Richard A. Robb, Rochester; Bruce M. Cameron, Mazeppa; James B. Seward, Rochester, all of Minn.

[73] Assignee: Mayo Foundation for Medical Education and Research, Rochester, Minn.

[21] Appl. No.: 08/982,014

[22] Filed: Dec. 1, 1997

Related U.S. Application Data

[60] Provisional application No. 60/031,850, Dec. 5, 1996.

[51] Int. Cl.[7] .................................................... G06K 9/00
[52] U.S. Cl. ...................... 382/128; 382/154; 345/355; 345/976
[58] Field of Search .................................... 382/128, 154, 382/289, 291, 295, 296; 345/419, 427, 113, 121, 125, 348, 355, 976, 977

[56] References Cited

U.S. PATENT DOCUMENTS

| | | | |
|---|---|---|---|
| 5,179,656 | 1/1993 | Lisle ........................................ | 395/159 |
| 5,608,849 | 3/1997 | King, Jr. ................................. | 395/119 |
| 5,734,384 | 3/1998 | Yanof et al. ............................ | 345/424 |
| 5,734,805 | 3/1998 | Isensee et al. .......................... | 395/119 |
| 5,835,692 | 11/1998 | Cragun et al. .......................... | 395/119 |
| 5,943,037 | 8/1999 | Hosking et al. ........................ | 345/139 |

*Primary Examiner*—Andrew W. Johns
*Attorney, Agent, or Firm*—Quarles & Brady, LLP

[57] ABSTRACT

Image data is acquired and a spatial coordinate system is attached to the image data set. A navigational guide employs the attached coordinate system to indicate to the viewer the orientation of the imaged object and the location of the viewer with respect to the imaged object. This indication is made in a number of ways, including the display of an icon which depicts the orientation of the object being viewed.

16 Claims, 4 Drawing Sheets

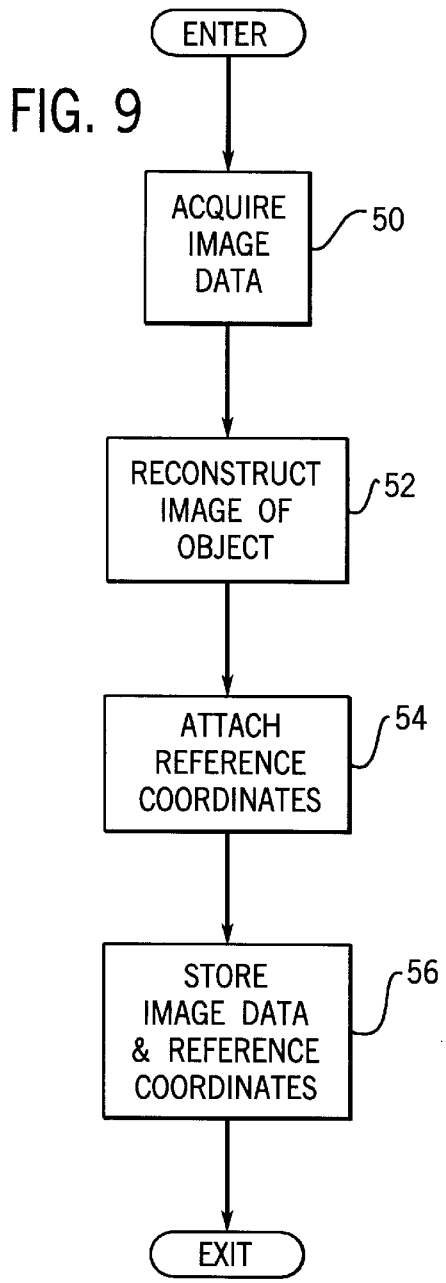
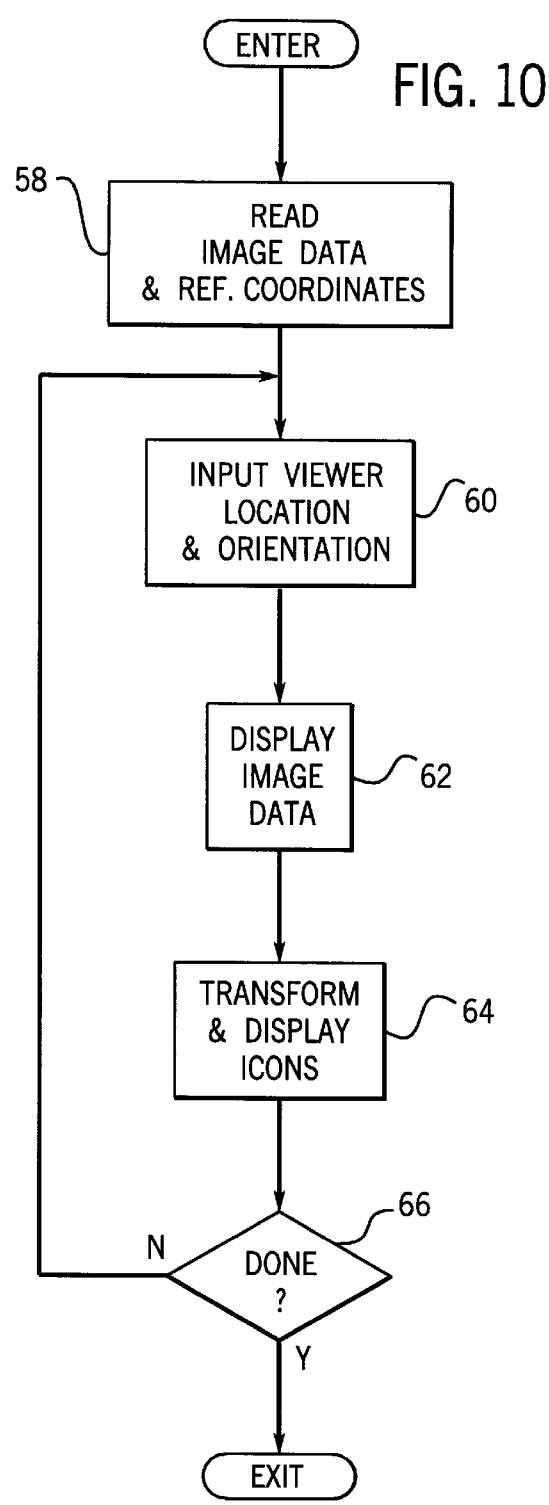

GRAPHIC NAVIGATIONAL GUIDES FOR ACCURATE IMAGE ORIENTATION AND NAVIGATION

This application is based on U.S. Provisional patent application Ser. No. 60/031,850, filed on Dec. 5, 1996.

BACKGROUND OF THE INVENTION

The field of the invention is the display of anatomical images using data acquired from medical imaging systems, and particularly the display of three-dimensional anatomical images.

Medical and technical societies interested in imaging technology have historically advocated standardized image presentations. The intent is to assist the viewer in orienting objects (usually anatomy) in a consistent manner from one examination to another. Using these published recommendations for tomographic image presentation, for example, the examiner can assume certain spatial relationships based on the use of standard views. Out-of-plane or contiguous anatomic relationships can be inferred based on the presentation of a "standard" tomographic view.

To date, medical imaging documents have dealt primarily with tomographic (two-dimensional)images and have only begun to look at three-dimensional images. Conventional tomographic (e.g. CT, MRI and ultrasound) scans produce cross sectional views ("slices") that are viewed sequentially, and consequently one must imagine or extrapolate what the actual 3 dimensional anatomy should be. By using sophisticated algorithms and high performance computing, this cross sectional two-dimensional data may be rendered into three-dimensional (volumetric) representations of human anatomy. This type of imaging is becoming routinely used in such clinical applications as surgery simulation, radiotherapy planning, and quantification of tissue pathology. Specific anatomy data sets may also be obtained for realistic (virtual) endoscopic simulation. Technologies capable of higher dimensional digital imagery have concentrated on the more realistic presentation of anatomy and physiology and have not focused on how to navigate these new presentations.

The term virtual reality ("VR") refers to a human-computer interface that facilitates highly interactive control over a three dimensional scene of sufficient detail so as to evoke a response similar to that of a real scene. VR can provide natural access to a 3D data set by separating the user from the traditional computer interface and from physical realities, allowing the user to study a model, at any scale and at any orientation, without having to study the process required to generate or display that model. The ideal VR interface immerses the user into a computer generated environment that responds to human gestures and language with visual, tactile and auditory cues in real time. This interface maps the user's real world frame of reference on to that of the computer generated environment and must provide, at a minimum, some form of motion cues if the user is to successfully perform tasks within the virtual environment.

Virtual endoscopy ("VE") refers to a new method of diagnosis based on computer simulation of standard, minimally invasive endoscopic procedures using patient specific three-dimensional anatomic data sets. Examples of current endoscopic procedures include bronchoscopy, sinusoscopy, upper GI endoscopy, colonoscopy, cystoscopy, cardioscopy and urethroscopy. VE visualization of non-invasively obtained patient specific anatomic structures avoids the risks (perforation, infection, hemorrhage, etc.) associated with real endoscopy and provides the endoscopist with important information prior to performing an actual endoscopic examination. Such understanding can minimize procedural difficulties, decrease patient morbidity, enhance training, and foster a better understanding of therapeutic results.

Implementing VE on a VR display system allows simultaneous visualization of structure (virtual space) and orientation cues in a realistic manner. This form of VE provides for viewing control and options that are not possible with real endoscopy, such as direction and angle of view, scale of view, immediate translocation to new views, lighting and texture modifications and anatomic measurements. Additionally, VE provides access to many body regions not accessible to or compatible with invasive probes. Regions such as the heart, spinal canal, inner ear, biliary and pancreatic ducts and large blood vessels are important anatomic structures ideally suited for VE exploration.

An object presented in the digital domain of a computer has no inherent reference system to retain a meaningful relationship with the object and its origin. In virtual endoscopy, and other medical virtual reality and three-dimensional visualization applications, for example, anatomic localization and orientation is often lost due to the often complex mapping of the user's real world coordinate system to that of the computer-generated environment. Views bounded by the interior walls of an organ or other anatomic structure, alterations in image scale, instantaneous translocation of position and direction and non-standard or novel views can contribute to user disorientation. Once one enters the digital domain of a computer, orientation becomes essential in order to avoid the phenomenon of "lost-in-space". Once there are no tactile or visual aids to determine direction (i.e., up from down, right from left, near from far, etc.) there is a tendency to lose a sense of position, orientation and spatial relationships.

The only orientation currently utilized in medical imaging pertains to the relationship of the medical imaging device relative to the object being imaged. Acquired images are frequently referenced to acquisition aids. Examples are the designation of left and right on an x-ray film, angle of incidence on a fluoroscopic examination, and an angle of projection or acquisition on a tomographic image.

The use of spatial icons is extremely limited. An example of a current 3-dimensional spatial icon is one which shows a limited number of projected images and a cartoon or virtual human body roughly corresponding to the image projected. There is no dynamic interactivity between the image and the accompanying cartoon and in addition there are no numerical aids for precise orientation or reorientation.

Documents advocating image standardization all recognize that there are three tomographic planes corresponding to the three primary spatial planes of height, width, and length. However, to date no system has been devised which allows complete interactivity between an image and a spatial recognition system for the purpose of fostering standard presentation or spatial orientation.

Three-dimensional presentations, by their nature have no "standard" presentation. A "standard" presentation places unrealistic constraints on the examiner and would be perceived as limiting innovation. It is anticipated that higher dimensional images will have limitless interactivity analogous to our interaction with objects in our day-to-day environment. If this is considered ideal, then standard presentations will be impossible to implement. This being the case, there is considerable need for the observer to be spatially oriented to virtual images regardless of the interaction or presentation of the image.

A compounding problem with digital imagery is the ability to acquire multi-dimensional images utilizing multiple types of acquisition devices (i.e. ultrasound, computerized tomography, magnetic resonance, etc.). Today, most acquired images are oriented relative to the acquisition device. Because acquisition technologies do not contain knowledge of spatial relationships, the instrument cannot assist in the presentation of familiar or standardized views. In the environment of today's imaging devices, neither the machine nor the user are knowledgeable of orientation. Image orientation is based primarily on the nature of the acquisition device and not the organ or physiology in question. Ideally, the image should be presented in a consistent manner, emphasizing the object under study and not the particular medical imaging system that is used to acquire the image data.

With the introduction of 3-dimensional imagery, one has the ability to work within a virtual environment where objects can be dissected (cut into pieces), banked in a computer repository (stored), retrieved (re-assessed), and serially compared. After retrieval, the object can be reprocessed and reformatted to enhance understanding. It is also possible to replicate electronically acquired images as physical models (i.e. restoration of physical characteristics of the object referred to as "physical" or "model prototyping"). Although the potential for three-dimensional imagery appears unlimited, presently both the user and the acquisition device have no intuitive and effective spatial recognition aids to accomplish these essential functions.

SUMMARY OF THE INVENTION

The present invention relates to a method for acquiring multi-dimensional imaging data sets and attaching to the data set a multi-axis spatial coordinate system which enables an image to be displayed in a consistent or "standard" orientation and which enables navigational icons to be produced on the image which facilitate the users understanding of image orientation and exploration of the image.

A general objective of the invention is to attach a spatial coordinate system to an image data set. The coordinate system may be attached at the time of acquisition or post-priori when anatomic or spatial landmarks can be identified. The spatial coordinate system becomes an integral component of the image and any dissected part of the image.

Another objective of the invention is to enable images to be re-oriented into a consistent format. Regardless of the imaging modality used, the image data set may be transformed to provide a constant view by rotating its attached coordinate system to a corresponding standard spatial orientation.

Yet another objective of the invention is to display navigational guides which assist the user in understanding and "navigating" a displayed image. These guides are driven by the spatial coordinate system attached to the image data set and they help the user determine the location and orientation of the imaged object, and the location of the viewer with respect to the object. Navigational guides provide information to the user through the use of on screen text, iconic/graphical representations and numerical coordinates. Text based guides typically present orientation and positional information as 3-space vectors (X,Y,Z and pitch, roll, yaw triplets) displayed on the screen as human readable characters. Iconic navigational aids fall into two general categories, 1) static icon with an animated indicator(s), and 2) dynamic icons. Static icon navigational aids, such as 2D and 3D localization guides display a static iconic or graphical representation of the image data (a cross-section of the original data or a semi-transparent model of the body for example) and use an animated indicator, such as a ball or pointer, to show position and/or orientation. Dynamic icon navigational guides indicate position and/or orientation by dynamically altering some aspect of the icon itself. For example, the orientation of the user's viewpoint can be indicated by rotating the icon so that the orientation of the icon itself reflects the orientation of the user's viewpoint.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 9 is a flow chart of an image formation process performed by the MRI system of FIG. 8; and FIG. 10 is a flow chart of a display process performed by the MRI system of FIG. 8.

DESCRIPTION OF THE PREFERRED EMBODIMENT

Figure 8:
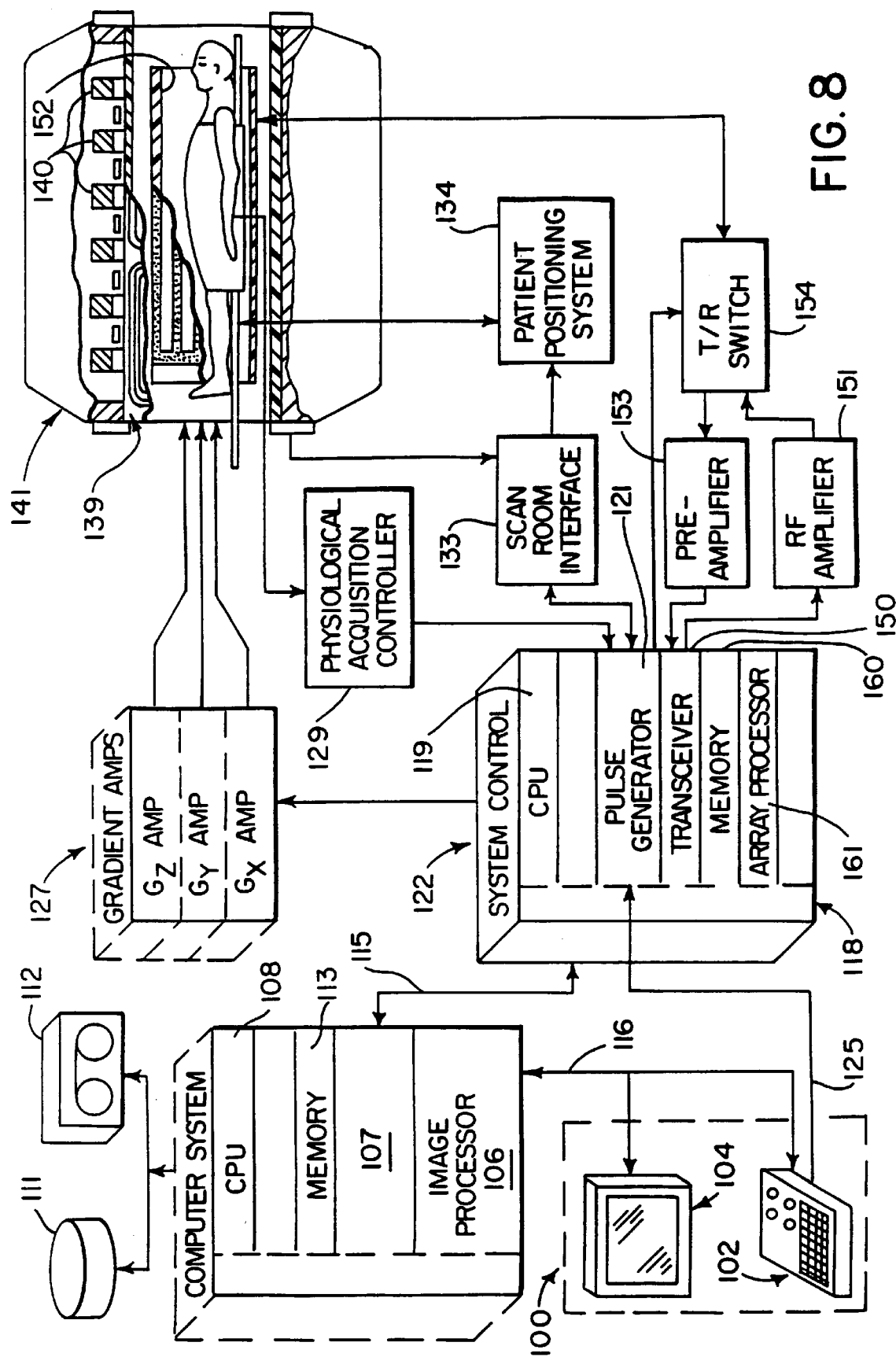
FIG. 8 is a block diagram of an MRI system to which the present invention may be applied.

Referring first to FIG. 8, there is shown the major components of a preferred MRI system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152. A transceiver module 150 in the system control 122 produces pulses which are amplified by an RF amplifier 151 and coupled to the RF coil 152 by a transmit/receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. This image data is conveyed through the serial link 115 to the computer system 107 where it is stored in the disk memory 111. In response to commands received from the operator console 100, this image data may be archived on the tape drive 112, or it may be further processed by the image processor 106 and conveyed to the operator console 100 and presented on the display 104.

The present invention is implemented by software which resides in the computer system 107. As will be described in more detail below, this software is employed during, or shortly after, the acquisition of the image data to enable the system or the operator to define spatial coordinates that are stored with the acquired image data. For example, in a 2D acquisition of a slice oriented at any angle with respect to the 3 gradient axes on the MRI system, the operator may designate two orthogonal coordinate axes in the plane of the image (such as an anterior/posterior axis, a left/right axis or a top/base axis) which relate the image to the orientation and location of the patient. Similarly, in a 3D acquisition the operator or the system can designate all three axes in the acquired 3D image data set. For example, the operator can use a track ball to locate a cursor at two locations in the image appearing on display 104, and designate the line connecting these two points as one of the above axes.

Figure 1:
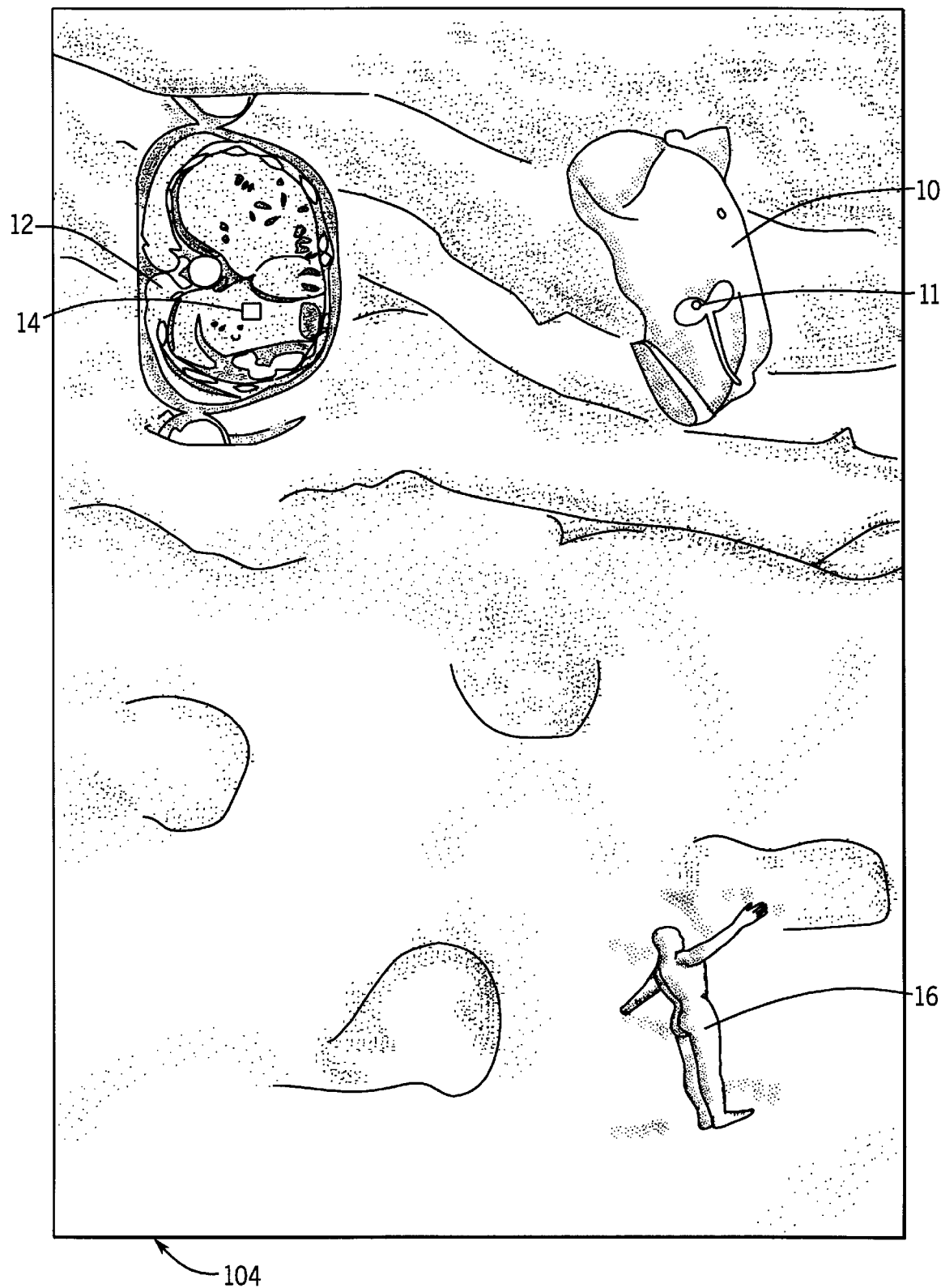
FIG. 1 is a pictorial representation of a displayed image containing three different navigation icons.

When the reconstructed image is subsequently viewed on the display 104, the software employs the defined spacial coordinates to produce one or more icons on the display 104 that indicate the spatial location and/or orientation of the viewer with respect to the patient. As will be described in more detail below, the operator may rotate the displayed image or move to display different locations in the reconstructed image using the control panel 102. The icon(s) are continuously updated to provide the operator with visual information that relates what appears on the display 104 to the spatial orientation of the patient. One preferred embodiment of this display is illustrated in FIG. 1.

The software for implementing the preferred embodiment of the invention is divided into an image formation process depicted in the flow chart of FIG. 9 and a display process depicted in FIG. 10. Referring particularly to FIG. 9, the image formation process begins by acquiring an image data set as indicated by process block 50. This is accomplished in the preferred embodiment described above by using an appropriate pulse sequence to acquire NMR data and reconstructing a 2D or 3D image as indicated at process block 52. As indicated at process block 54, the next step is to manually or electronically attach reference coordinates to the image.

Although multiple techniques can be utilized to attach spatial coordinates, one mechanism is, at the time of acquisition, to imbed two spatial coordinates into a 2-dimensional tomographic image, and at least three spatial coordinates into a 3-dimensional volumetric image. For example, with a 2-dimensional tomographic acquisition device placed to the front of the chest of a patient, the operator places two orthogonal spatial coordinates within the plane of the image before or at the beginning of the acquisition (for example, a "short axis" view would require 2 coordinates such as anterior [A] and left [L]). The resultant short-axis tomographic image then contains an immutable spatial orientation with respect to the patient as indicated by its attached coordinate system. In a digital environment, instruments will then have knowledge of the type of view represented by an image based on the spatial coordinate system stored with the image (i.e. in this example, a short axis view which incorporates the two dimensions of height and width).

Using this same example, if another tomographic device obtains a comparable short axis image from the posterior chest orientation, the second image will also contain spatial coordinates. Consequently, an imaging device which receives both images can read the spatial coordinates of both images and automatically re-orient the acquired images into a standard uniform presentation.

More complex volumetric (three-dimensional) images require the placement of three spatial coordinates, which are identified manually or electronically at the time of acquisition, but which can also be implemented post priori. For example, to attach spatial coordinates in a 3-dimensional image, two orthogonal two-dimensional tomographic images may be labeled. The first tomographic image is labeled with two spatial coordinates, for example anterior (A) and left(L). By spatial definition this is a "short axis" view (i.e. two dimensions of height and width). A second, orthogonal two-dimensional tomographic view is then obtained and labeled with one additional spatial marker and labeled base (Base). By spatial definition, this is a "long axis" view (i.e. third dimension of length).

Another means of attaching a spatial coordinate system to an image is to attach a spatial recognition system to the medical imaging system which acquires that image. Various spatial sensors can be utilized, such as a spark gap, acoustic, electromagnetic, spatial sensing transducer or catheter. This automatic system is preferred because it requires less operator interactivity and has better reproducibility.

Referring again to FIG. 9, once the spatial coordinate system is attached to the image data set both are stored as indicated at process block 56. The coordinate system follows that image data set regardless of how it is handled. If the image data set is dissected, rotated or changed in any manner, the attached coordinate system follows.

Referring particularly to FIG. 10, when the image is to be displayed the display process is entered and the image data and attached reference coordinate system are read from memory as indicated at process block 58. As will be explained below, when an image is displayed using the image data set, an icon is also displayed which indicates the orientation of the imaged object relative to the attached spatial coordinate system. The spatial icon is, therefore, interconnected to the imaged object by the attached spatial coordinate system. This interconnection means that when the imaged object is rotated, the spatial coordinates also rotate in concert causing the displayed spatial icon to also rotate. This allows the observer to understand the spatial re-orientation. Likewise, if the icon is rotated in any manner, the orientation of the imaged object is changed in a like manner. There is total interactivity between the image and spatial icon. As a result, either the icon, the object, the acquisition, acquisition device, or examiner can create new, unique, or standard presentations.

By attaching a spatial coordinate system and using it to drive a spatial icon, both the computer system as well as the viewer know spatial orientation. Such mutual knowledge enhances uniformity and understanding of complex as well as simple images. If a standard presentation is desired, the icon can be oriented in that desired presentation and the imaged object will move to the desired, "standard" orientation. The spatial coordinate system accompanies dissected, stored, and retrieved image objects, and they thus all separately retain their spatial relationship.

An example of a displayed image and associated icons is illustrated in FIG. 1. The 3D image data set depicts the inside of a stomach, and the image produced on the display 104 is a view from inside the stomach. The 3D navigation icon 10 in the upper right corner of the display indicates at dot 11 the location of the viewer inside the body and the 2D slice navigation icon 12 in the upper left corner precisely locates the viewer in a 2D slice taken through the body by increased intensity, as indicated at square 14. The orientation icon 16 in the lower right corner of the display indicates the angle at which the imaged object (i.e. a human being in the preferred embodiment) is being viewed. As the operator moves around through the 3D image data set using a track ball at the control panel 102, the dot 11 moves around in the icon 10 and the square 14 moves around in the icon 12. The orientation of the icon 16 rotates in space to align it with the operator's line of sight into the imaged object being displayed. In the example depicted in FIG. 1, the stomach is being viewed from the location indicated by dot 11 and square 14, and it is being viewed along an axis directed to the front and left side of the patient as shown by icon 16.

Figure 2:
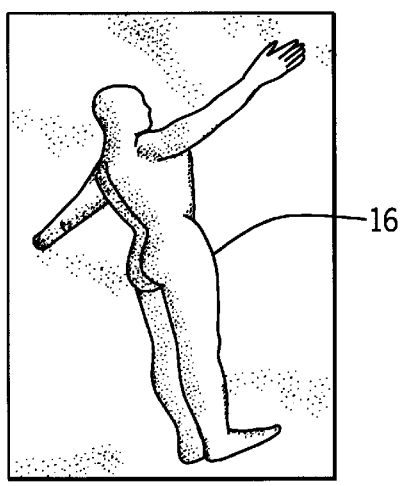
FIG. 2 is a pictorial representation of one of the navigation icons in FIG. 1
Figure 3:
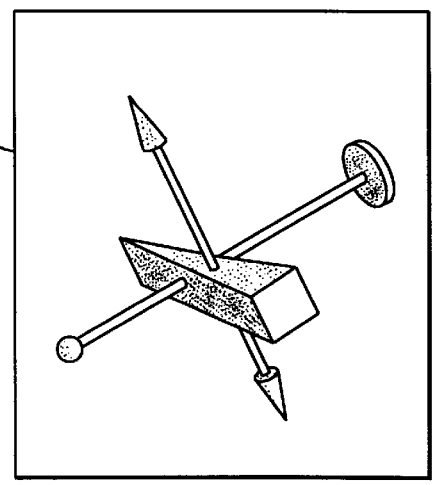
FIG. 3 is a pictorial representation of an alternative navigation icon.
Figure 4:
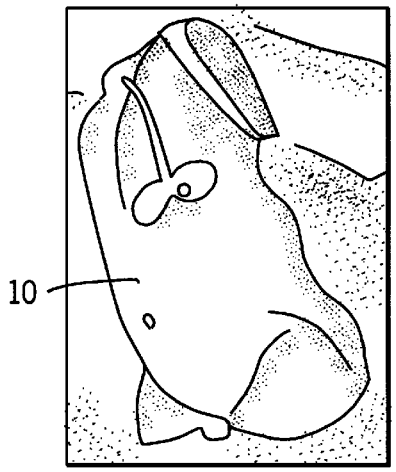
FIG. 4 is a pictorial representation of another one of the navigation icons in FIG. 1.
Figure 5:
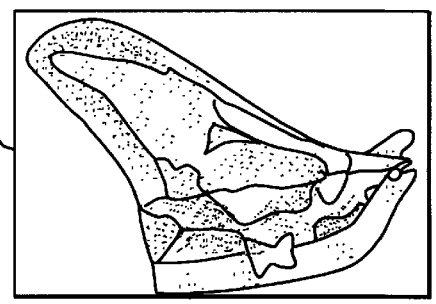
FIG. 5 is a pictorial representation of an alternative navigation icon.
Figure 6:
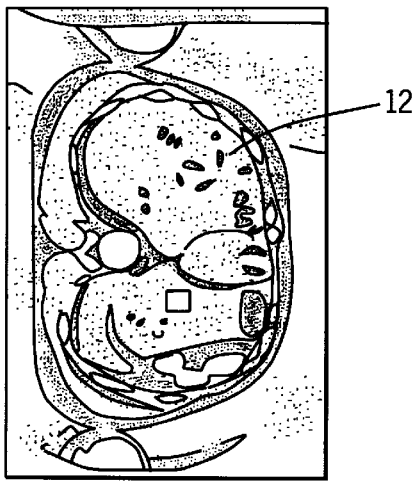
FIG. 6 is a pictorial representation of a third navigation icon in FIG. 1.
Figure 7:
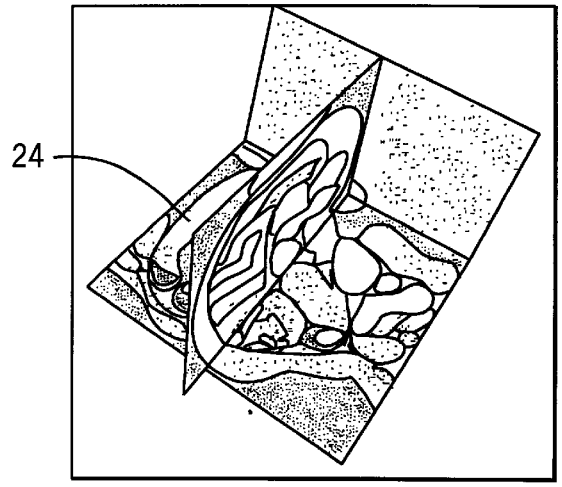
FIG. 7 is a pictorial representation of an alternative navigation icon.

The orientation icons 10, 12 and 16 can be displayed on the same screen 104 as the imaged object being viewed, or they can be displayed separately. Also, as shown in FIGS. 2–7, the navigation guide icons can take many forms. FIG. 2 shows the preferred orientation icon 16 used for medical images of humans and FIG. 3 shows an alternative orientation icon 20 used to indicate the operator's line of sight. FIG. 4 shows the 3D orientation icon 10 preferred for medical imaging of the human stomach and FIG. 5 is an alternative icon 22 of the heart. FIG. 6 is the 2D slice navigation icon 12 and FIG. 7 is an alternative navigation icon 24 in which the viewer's location in a 3D object is depicted by three, orthogonal slices that intersect at that location.

Referring again to FIG. 10, to create these navigational guides, it is necessary to monitor, in real time, the position and orientation of the user's viewpoint within the computer generated environment as indicated at process block 60. The updated view of the image data is then displayed at process block 62 and the updated location and angular orientation data is coupled to a navigational guide process. This is an asynchronous process which is independent of the display process and its function is to transform the location and orientation of the icon and display it on the screen 104 as indicated at process block 64. Once the localization and orientation data for the operator's viewpoint have been passed to the navigational guide process 64, it performs all necessary and appropriate transformations prior to updating the icon on display 104.

Transformations may be as simple as applying a rotation matrix to the icon's viewpoint matrix or as complex as remapping the coordinates from one space to another. If the user's exact location in the image data set is represented by the vector $\overline{XYZ}$, where $\overline{XYZ}=(x,y,z)$ and the user's angular orientation is represented by the vector $\overline{HPR}$, where $\overline{HPR}$=(rotation about x, rotation about y, and rotation about z) with all rotations considered to be centered about the user's viewpoint, then for the navigational guides pictured in FIGS. 1–7 the transformations necessary to drive them to their new orientation are given as follows. These transformations are performed in real time as the operator moves through the imaged object by manipulating a track ball.

The following equation (1) is employed to calculate the angular orientation of an orientation icon such as that in FIGS. 2 and 3:

$$\overline{MP} = \left(\overline{HPR}\begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix}\right)\overline{MP} \quad (1)$$

The following equation (2) is employed to calculate position in an anatomic localization such as those in FIGS. 4 and 5:

$$\overline{BP} = \left(\overline{XYZ}\begin{bmatrix} 1 & 0 & 0 & 0 \\ 0 & 1 & 0 & 0 \\ T_x & T_y & T_z & 0 \\ 0 & 0 & 0 & 1 \end{bmatrix}\right)\overline{BP} \quad (2)$$

And the following equation (3) is employed to calculate position and orientation for a 2D localization icon such as that shown in FIG. 6:

$$\overline{XYZ_s} = \left( \overline{XYZ} \begin{bmatrix} 1 & 0 & 0 & 0 \\ 0 & 1 & 0 & 0 \\ T_x & T_y & T_z & 0 \\ 0 & 0 & 0 & 1 \end{bmatrix} \right), \quad (3)$$

$$\overline{HPR_s} = \left( \overline{HPR} \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix} \right)$$

Calculation of the icon orientation (equation 1) consists of applying an appropriate transformation matrix (typically the rotation about the y axis must be flipped) to $\overline{HPR}$ and then applying the transformed $\overline{HPR}$ to the previous icon rotation matrix $\overline{MP}$ to produce a new icon rotation matrix $\overline{MP}$. Thus the icon is correctly rotated to reflect the current orientation information.

Equation 2 illustrates the calculation of the location dot 11 in the 3D anatomic icon 10. Here, a transformation matrix is applied to $\overline{XYZ}$, mapping the viewpoint location into the coordinate space of the icon. The transformed $\overline{XYZ}$ is then applied to the icon's translation matrix $\overline{BP}$. The resulting matrix then becomes the new icon translation matrix and is used to animate the location indicator 11 in the icon 10.

To determine 2D localization (see equation 3), both $\overline{XYZ}$ and $\overline{HPR}$ must be transformed, producing $\overline{XYZ_s}$ and $\overline{HPR_s}$. $\overline{XYZ_s}$ is used not only to locate the position indicator on the displayed data section, it is also used in determining which data section to display as the orientation icon 12. $\overline{HPR_s}$ is used to calculate an oblique rather than an orthogonal data section. The transformation matrix used in equation 3 must translate $\overline{XYZ}$ and $\overline{HPR}$ into the coordinate space of the original data set.

While it is possible for the navigation guides to share a display with the primary image (as shown in FIG. 1), one of the advantages of the navigational guide remaining as an independent process 64 is that it may have its own unique display. The navigational guide may be fused with the primary image's display 104 in a number of ways. Typically, it is drawn into the overlay or underlay planes of the system's frame buffer or, with appropriate clipping and Z buffering, it may be drawn directly into the primary scene depicted on the display 104.

The display process loops at decision block 66 to continuously receive new location and/or orientation data from the operator. The image data and the linked icons are then promptly reoriented on display 104 in real time.

Once the spatial coordinate system is attached to the imaged object, the operator can navigate on the object as with global navigation techniques, or the operator can navigate throughout the object as with celestial navigation techniques. If the imaged object is divided, the spatial coordinate system also divides, or replicates itself and remains with each part. Separate icons are generated for each separate part and linked thereto by the separate spatial coordinate systems. The imaged object is thus infinitely divisible and a separate icon is created for each divided part.

The attached spatial coordinate system also facilitates the merger of two images. For example, an object may be imaged more than one time, or it may be imaged with different imaging modalities and combined to form a single image. In this case the separate spatial coordinate systems are used to bring the two images into exact registration, the images are combined to form a single image and a single spatial coordinate system.

A spatial icon system increases freedom of interactivity without obligating the observer to a standard presentation. The spatial icon fosters a more sophisticated and user friendly image management mechanism. A spatial coordinate system as disclosed herein enables totally interactive imaging of electronically stored images while obtaining precise coordinates. In addition, the imaging system can be made more intelligent through its knowledge of the imbedded spatial coordinate system. The system can be taught to initiate certain functions such as replicate a specific view.

It should be apparent to those skilled in the art that the present invention is particularly applicable to medical imaging, but may also be applicable to other fields. In addition, while the invention has been described in connection with an MRI system, the invention is equally applicable to other imaging modalities such as x-ray CT and ultrasound. Indeed, the present invention is particularly useful in merging images acquired with different imaging modalities.

What is claimed is:

1. In an imaging system for viewing a three-dimensional image data set acquired with a medical imaging system, the method comprising:

attaching a spatial coordinate system to the acquired three-dimensional image data set which indicates a reference orientation and location of an object being imaged;

displaying an image of the object that is reconstructed from data in the acquired three-dimensional image date set; and displaying a navigational guide which employs the attached spatial coordinate system to indicate the position or orientation of the viewer with respect to the object being displayed.

2. The method as recited in claim 1 in which the navigational guide is an icon which is a pictorial representation of the object being imaged.

3. The method as recited in claim 1 in which the navigational guide is an icon which is a pictorial representation of a human.

4. The method as recited in claim 1 which includes:

inputting viewer orientation data which indicates a change in viewer orientation with respect to the spatial coordinate system;

changing the orientation of the view of the object being displayed to correspond with the viewer orientation data; and transforming the displayed navigational guide by a corresponding amount to indicate the new position or orientation of the viewer with respect to the object being displayed.

5. The method as recited in claim 1 in which the spatial coordinate system is manually attached to the acquired image data set by inputting data which defines two orthogonal spatial coordinates.

6. The method as recited in claim 1 in which the spatial coordinate system is manually attached to the acquired image data set by inputting data which defines three orthogonal spatial coordinates.

7. In a system for displaying a stored three-dimensional image of an object, the method comprising:

attaching a spatial coordinate system to the stored three-dimensional image;

inputting from a viewer data which indicates the orientation of the viewer with respect to the stored three-dimensional image of the object;

displaying the stored three-dimensional image at an orientation indicated by the data input from the viewer;

displaying an icon representative of the object being imaged; and orienting the icon on the display using the attached spatial coordinate system to indicate to the viewer the direction from which the displayed object is being viewed.

8. The method as recited in claim 7 in which the viewer may input further data to change the orientation at which the stored image is being viewed and the icon is reoriented on the display by a corresponding amount.

9. The method as recited in claim 8 in which the icon is a pictorial representation of the imaged object.

10. The method as recited in claim 7 in which the spatial coordinate system is manually attached to the stored image by inputting data which defines two orthogonal spatial coordinates.

11. The method as recited in claim 7 in which the spatial coordinate system is manually attached to the stored image by inputting data which defines three orthogonal spatial coordinates.

12. An imaging system for viewing a three-dimensional image data set acquired with a medical imaging system, which comprises:

means for attaching a coordinate system to the acquired three-dimensional image data set which indicates a reference orientation and location of an object being imaged;

means for selecting a viewing location and viewing orientation within the three-dimensional image data set;

means for displaying an image of the object at the viewing location and viewing orientation that is constructed from data in the acquired three-dimensional image data set; and means for displaying a navigational guide which employs the attached spatial coordinate system to indicate the viewing position or viewing orientation of the viewer with respect to the object being displayed.

13. The imaging system as recited in claim 12 in which the navigational guide is an icon which is a pictorial representation of the object being imaged.

14. The imaging system as recited in claim 13 in which the means for displaying a navigational guide rotates the icon with respect to the attached spatial coordinate system in response to changes in the selected viewing orientation.

15. The imaging system as recited in claim 14 in which the cion is a three-dimensional representation of a human body.

16. The imaging system as recited in claim 13 in which the means for displaying a navigational guide indicates a location on the icon that moves with respect to the attached spatial coordinate system in response to changes in the selected viewing location.

* * * * *